United States Patent [19]
Jones et al.

[11] 3,873,825
[45] Mar. 25, 1975

[54] APPARATUS AND SYSTEMS USING BROAD BAND RADIATION PULSE SOURCE

[75] Inventors: Robert Patrick Jones, South Bound Brook; Peter Michael Rentzepis, Millington, both of N.J.

[73] Assignee: Bell Telephone Laboratories, Incorporated, Murray Hill, Berkeley Heights, N.J.

[22] Filed: May 9, 1973

[21] Appl. No.: 358,734

[52] U.S. Cl. ........... 250/199, 179/15 FD, 331/94.5, 332/7.51, 350/169, 179/15 FD;15 BC
[51] Int. Cl. ............................................. H04b 9/00
[58] Field of Search ................... 250/199; 350/169; 331/94.5; 332/7.51; 328/15–17

[56] References Cited
UNITED STATES PATENTS
3,676,684  7/1972  De Lange .......................... 250/199
3,703,640  11/1972  Broussaud et al. ................. 250/199

Primary Examiner—Benedict V. Safourek
Assistant Examiner—Marc E. Bookbinder
Attorney, Agent, or Firm—G. S. Indig

[57] ABSTRACT

Picosecond pulses produced from mode-locked lasers are passed through high Raman coefficient media in which a variety of Stokes and anti-Stokes frequency transitions result. The exiting pulse, which may have an envelope of the same order of magnitude time duration, contains a virtual continuum of wavelengths. The "white" pulse so produced is then spatially and/or phase divided into a series of "component" pulses each containing distinct spectral portions of that contained within the white pulse. Component pulses are then processed, for example, by passage through a sample or by passage through a modulator. Information so imparted, generally taking the form of an amplitude change, may serve to spectrally identify the nature of the sample or may serve a communications function.

30 Claims, 3 Drawing Figures

FIG. 1

APPARATUS AND SYSTEMS USING BROAD BAND RADIATION PULSE SOURCE

BACKGROUND OF THE INVENTION

1. Field of the Invention

The invention is concerned with apparatus and systems utilizing light pulses of duration of the order of picoseconds. Uses include spectroscopy and optical communications systems.

2. Description of the Prior Art

169 *Science*, 239 (1970) is a review dealing with picosecond duration light pulses as produced by mode-locked lasers. Development of the instrumentation for producing and detecting such short duration pulses has resulted in a major upheaval in science areas concerned both with experimentation and with theory.

The very observation of the picosecond pulse first accomplished by means of a multiphoton process is one of the more elegant events in the continuing development of the laser sciences. See 11 *Applied Physics Letters*, 218 (1967). Continuing work has resulted in creation of closely spaced picosecond pulses; that is, orders of magnitude more closely spaced than the nanosecond transversal time in the mode-locked laser responsible for their creation. See 42 *Journal of Applied Physics*, 3415 (1971). A recent development having profound implications in the field of spectroscopy involves use of a progressive shutter operating on a self-bleaching dye or Kerr principle to result in a spectrum printout which is time resolved on times of the order of $10^{-4}$ second. See 25 *Physical Review Letters*, 1742 (1970).

While the very short duration of the picosecond pulse implies a plurality of modes of differing wavelength, the nature of the mode-locked laser mechanism inherently limits the spectral content of the pulse envelope. A competing laser mechanism which has found some use by spectroscopists involves use of relatively broad band capability dye lasers. Dye lasers inherently capable of yielding stimulated emission over bands of the order of 500 Angstrom units or greater in the visible spectrum have, through more recent modifications, been rendered capable of operation over bands of the order of one-third the visible spectrum or greater. See, for example, 16 *Applied Physics Letters*, 405 (1970). Arrangements for continuously varying the wavelength output of a dye laser and utilizing this output for spectrometric observations have been described.

From its inception, the laser oscillator was recognized as a means for further extending the frequency range of carrier waves for communications. A most attractive inherent advantage of operation with carriers in the visible or near visible spectrum is increased bandwidth. While laser communications systems have never lost their appeal and while work continues to be reported in the current technical literature, there has been a shift in emphasis from the concept of expanded bandwidth.

Early developments in laser communications systems produced significant advances in components, such as, the oscillator, itself; means for shifting frequency as, for example, by use of non-linear effects including second harmonic generation and parametric oscillation; isolators operating on magneto-optic principles; modulators involving such interactions as electro-optic, magneto-optic, acousto-optic, etc.

For some considerable period of time, components have been available for processing signal bands of the order of a half gigahertz in width. During this period, various approaches directed toward development of transmission media did not keep pace with component developments. A variety of media continue to be of promise for bandwidth systems but efforts directed toward their further development appear to have diminished.

A recent trend of growing intensity has been concerned with a somewhat different aspect of optical communications. Fiber transmission lines constructed of low loss glass, such as, silica or modified silica and sometimes clad with material of lower refractive index, are now considered to be of interest in such communications systems, not because of broad bandwidth capability, but because of small cross-section and possible economic advantages as compared with competing approaches. Recently described glass lines manifest losses as low as 4 dB per kilometer in the near infrared. Based on such characteristics and on tolerable repeater spacing, feasible bandwidth for such lines is of the order of 10 to 100 megahertz, or, for pulse systems, 10 to 100 megabits per second. Such lines are of primary interest as direct subscriber lines for relatively broad band services such, for example, as video transmission, high speed data systems, etc.

SUMMARY OF THE INVENTION

In accordance with the invention, short duration pulses of the order of picoseconds or less in time and of high peak powers of the order of megawatts are passed through critically selected media which, through a variety of mechanisms, results in the generation of new frequency components which may be within the original pulse envelope. Under optimum conditions, sufficient additional components are introduced so that the pulse may now be considered as being made of white light rather than of the limited discrete modes introduced by the usual generating source—a mode-locked laser. Media satisfactory for this purpose are generally isotropic, desirably evidence high transprency over a broad spectral range, and generally have transparency high Raman conversion efficiencies. In addition, best media to date have evidenced relatively low frequency dispersion, although this characteristic may be of primary interest only in one class of embodiments of the invention.

The manifestations resulting in the introduction of new frequency components and displaying a virtual continuum over spectral regions which may include the entire visible spectrum and beyond are, from a consideration of the many elements involved, due, not to the extremely short duration of the initiating pulse, but rather to the very high peak power which makes possible introduction of the various frequency components by mechanisms which are relatively inefficient at lower power levels.

In a particular embodiment of the invention, significance in the white pulse is, again, associated not so much with short duration as with its virtual continuum of wavelengths. This embodiment is a communications system which by analogy to some previous systems may be described as frequency multiplexed. In this embodiment, subcarriers are produced, for example, by segmenting the total spectral content of the white pulse into a series of pulses, perhaps as many as 100 or 1,000 or 10,000. These subcarriers are then modulated usually simply by selective removal in digital fashion. Continuing this preferred embodiment, such segmented portions are reconstituted into a pulse which closely resembles the original white pulse but for omission of certain spectral components or other change introduced by modulation. A pulse train made up of such reconstituted pulses is then transmitted in the usual fashion and is then demultiplexed at the receiving end by means similar to that utilized in multiplexing.

An embodiment of significance to the fundamental scientist involves spectroscopy. In general, such use takes advantage of the fact that the white pulse envelope is of the same order of magnitude as that of the generating pulse emanating from the mode-locked laser (although considerable time broadening may result particularly where anti-Stokes transitions play a significant role). As noted in the preceding section, availability of picosecond pulses has been attended by concomitant advances in spectroscopy, not the least of which involves improvements in time resolution. Availability of white pulses, also of such short duration, permits more expedient detailed studies of molecular systems and may provide kinetic information for such diverse phenomena as internal conversion, intersystem crossing, photochemical isomerization, dynamics of solute-solvent interactions, vibrational relaxation, etc.—all over the entire spectrum of interest. A variety of systems permit irradiation of a sample: by selected, perhaps sequential, pulses representing distinct spectra; by radiation of continuously varying wavelength; or by radiation of a fixed wavelength band of desired bandwidth.

While, as noted, the inventive functions all depend upon the initial introduction of pulses of the order of picoseconds or less in duration, embodiments may depend upon time expansion of such pulses into relatively long pulses or even into quasi-continuous radiation.

DETAILED DESCRIPTION

1. Terminology

It is convenient to describe the invention in terms which may be overly simplistic in view of the complexity of the involved phenomena. Such terminology is adopted for pedagogical reasons only and is not to be construed as limiting. Terms are defined:

Initiating Pulse: This is the pulse of duration of picoseconds or less which is introduced into the frequency converting medium. Ordinarily, such pulses are emitted by mode-locked lasers—for example, $Nd^{3+}$ mode-locked glass laser. Center frequencies may be inappropriate for development of the broadest or otherwise desired spectrum in the frequency conversion medium, and it may be desirable to make a step-wise conversion. This may be accomplished, for example, by use of a second harmonic generator (SHG) which, in this instance, results in a center of approximately $0.53 \mu m$. For most purposes, no distinction is made between such a pulse as emitted by the laser or as frequency converted by a non-linear element. This initiating pulse is characterized by a finite number of distinct modes, introduced, for example, by a laser and which inherently satisfy the Fourier requirements for defining the pulse envelope. Suitable mode-locking arrangements and also improvisions for properly spacing modes of appropriate amplitude for attaining very short duration pulses are described in 57 *Institute of Electrical Electronics Engineers*, 1 (1969) and 33 *Annals New York Academy of Sciences*, 284 (1971).

Conversion Medium: This is the material responsible for introduction of new frequency or wavelength components of radiation into a pulse envelope usually similar to that of the initiating pulse. This medium may consist of one or a series of bodies which may be homogeneous, heterogeneous, or graded in composition. The requirements of the conversion medium are set forth in detail in a subsequent section. Functioning of the medium is generally discussed in terms of Raman conversion, either Stokes or anti-Stokes, and the ancillary harmonic or anharmonic beating of the various wavelengths initially present and/or produced by conversion. The possibility of some contribution by other conversion mechanisms is, however, not precluded; and it is also clear that conversion mechanisms may be aided by phenomena, such as, self-induced filamentation. Certain non-linear processes might become influential as a result of the high power contained within the filaments.

White Pulse: This is the pulse emanating from the conversion medium and now containing a very large number of wavelengths introduced by the conversion medium. While careful analysis of this pulse shows some structure, this is not so pronounced as to make improper the use of the term white. As implied, the white pulse now contains a substantial continuum of wavelengths. This has been experimentally substantiated by frequency division of the white pulse into spectral portions of bandwidth within an order of magnitude of the Heisenberg uncertainty limit without significant variation in amplitude from portion-to-portion. The term white does not imply such fairly constant amplitude over the entire frequency spectrum of the pulse but only over the spectral width of the initiating pulse. In the usual situation, the near-constant amplitude does, however, extend well beyond the spectral width of the initiating pulse.

Prism: This is used in its regularly assigned meaning of an element having significant frequency dispersion and such configuration as to result in some spatial displacement of portions of white radiation based on wavelength. Prisms contemplated generally utilize smooth, uninterrupted surfaces so that frequency displacement of radiation is continuous. Prisms may operate on transmission with or without deliberate reflection; and index of refraction may be fixed (except as dependent upon the effect of radiation being processed) or may be varied, for example, through an electro-optic interaction. In this context, grating can also be utilized.

Echelon: This is a term here designating an element so designed as to provide varying delay times for portions of a radiation wave front as a step function. A typical echelon may resemble a staircase lying on its back so that different portions of the wave front traverse paths of differing lengths. It is, of course, a requirement that the refractive index of the echelon be different from that of coupling ambient or elements. Since the essence of the echelon is varying delay time for different portions of the wave front, the requirement may be satisfied by a stepped variation in index of refraction with or without varying physical traversal path length. It is not required that an echelon be made up of a single body of material. So, for example, the function may be performed by a bundle of transparent fibers of differing lengths of index. Variation in length may be accomplished simply by sectioning the bundle on a bias plane. Echelon and prism functions may be performed by a single element of appropriate design and orientation (e.g., a wedge prism having a stepped surface).

Component Pulse: This is a pulse produced by a fragmentation of the white pulse so as to reduce its spectral content. Contents of such a component pulse also represent a substantial continuum of wavelengths although of lesser bandwidth. Pulse duration of component pulses is generally, but not necessarily, of the same order of magnitude as that of the white pulse and, in turn, as that of the initiating pulse. Component pulses produced, for example, by one or a series of echelons are generally spatially separated and may also be phase separated but may overlap in space and/or phase, and in the extreme may be represented as a front of varying frequency. Phase separation is expedient in certain types of spectroscopy and also may be desirable to permit practical placement of modulating elements, for example, in a communications system.

Modulation: Refer to the alteration, generally in amplitude, of a portion or of the entirety of a component pulse. This modulation may be inherent and characteristic of the operation being performed as exemplified by specific absorption by a sample being studied spectroscopically. Modulation also implies its usual communications connotation in accordance with which alteration is deliberately introduced to represent intelligence information.

Modulator: This is an element utilized to produce a variation in a component pulse responsive to intelligence information. While the exemplary communications system described implies a digital modulator which functions simply to pass or block a component pulse, analog modulation in a more sophisticated system is not precluded. Interactions which may serve are, inter alia, acousto-optic and magneto-optic. Modulators operating on any of these principles have the capability of response times sufficient to accomodte interpulse spacing normally encountered in the emanations from mode-locked lasers.

Progressive Shutter: Is an element interposed, for example, in a pulse stream thereby generally blocking the entirety of a wave front when in the closed condition. It is capable of being opened in progressive fashion in the manner of the slit of a focal plane shutter; so that, for example, a transmitting region may travel progressively in a direction orthogonal to pulse travel, thereby permitting passage of a differing fraction of the pulse. Progressive opening may be due to use of a bleaching dye cell or a Kerr cell. Operation may require use of one or a pair of polarizers which are typically crossed and straddling the cell. In a common arrangement utilized in spectroscopy, a progressive shutter is opened by a split portion of an initiating pulse, a white pulse, or a component pulse, a portion of which has been modulated and which is being passed through the shutter.

2. Operating Limits and Characterizations a. The initiating pulse must have a sufficiently high peak power to result in the desired continuum in a conversion medium. Typical conversion media have been found to operate effectively with peak powers of the order of a megawatt. While limits are dependent upon the nature of the conversion media, a typical permitted peak power range may be defined as extending from 10KW to 5GW. The low limit is dictated by the desire to produce substantially uniform amplitude of wavelengths resulting from relatively inefficient frequency transformation mechanisms, while the maximum is occasioned by such considerations as undue heating of the medium and non-linear effects which may cause pulse broadening and imposition of pronounced structure. Even this upper limit may be unnecessarily restrictive for certain purposes, for example, for a communications system in which operation is purely digital. Pulse length, defined as the width of the pulse at one-half the peak power, for inventive purposes, does not exceed a maximum of approximately 100 picoseconds for fluids in general but for usual liquid conversion media should not exceed about 10 picoseconds. The frequency transformations necessary to operation of the invention are dependent upon peak power but absorption within even the most transparent conversion media result in undue heating and/or electrostriction (resulting in local index variations and accompanying scattering) where power levels are maintained for periods in excess of those corresponding with the maximum pulse width indicated. Undue heating in the extreme may result in destruction of the conversion media. Initiating pulses emanating from mode-locked lasers are inherently separated by distances corresponding with twice the optical traversal distance of the laser oscillator. For practical structures, to date, such spacings are of the order of a nanosecond or greater. While greater spacings present no problem, close spacings produced, for example, by lasers arranged in tandem or by pulse multiplication arrangements, may again result in a heating problem depending upon the dissipation properties of the conversion medium. For the usual case, it is desired that initiating pulse spacings be of the order of 100 picoseconds or more. Severity of this limit may be minimized by use of circulating conversion media and/or by cooling means.

Where it is desired to retain short time pulse length envelope during passage through the conversion medium, the center frequency of the pulse introduced into the medium should be high. Stokes transitions (down shifts in frequency) involve only virtual electronically excited states and, therefore, occur with very little time lapse. Anti-Stokes transitions, on the other hand, involve the excitation of electrons at a vibrational or rotational excited state associated with a ground state at which there is finite lifetime. Lifetimes may be 10 or 100 picoseconds or even longer. Excitation from such states, resulting in upconversion in frequency, may therefore lag the remainder of the pulse by times of this order. It follows that minimal time pulse length corresponds with conditions in which there are only Stokes conversions or in which anti-Stokes conversions are otherwise disregarded.

Figures 2, 3:
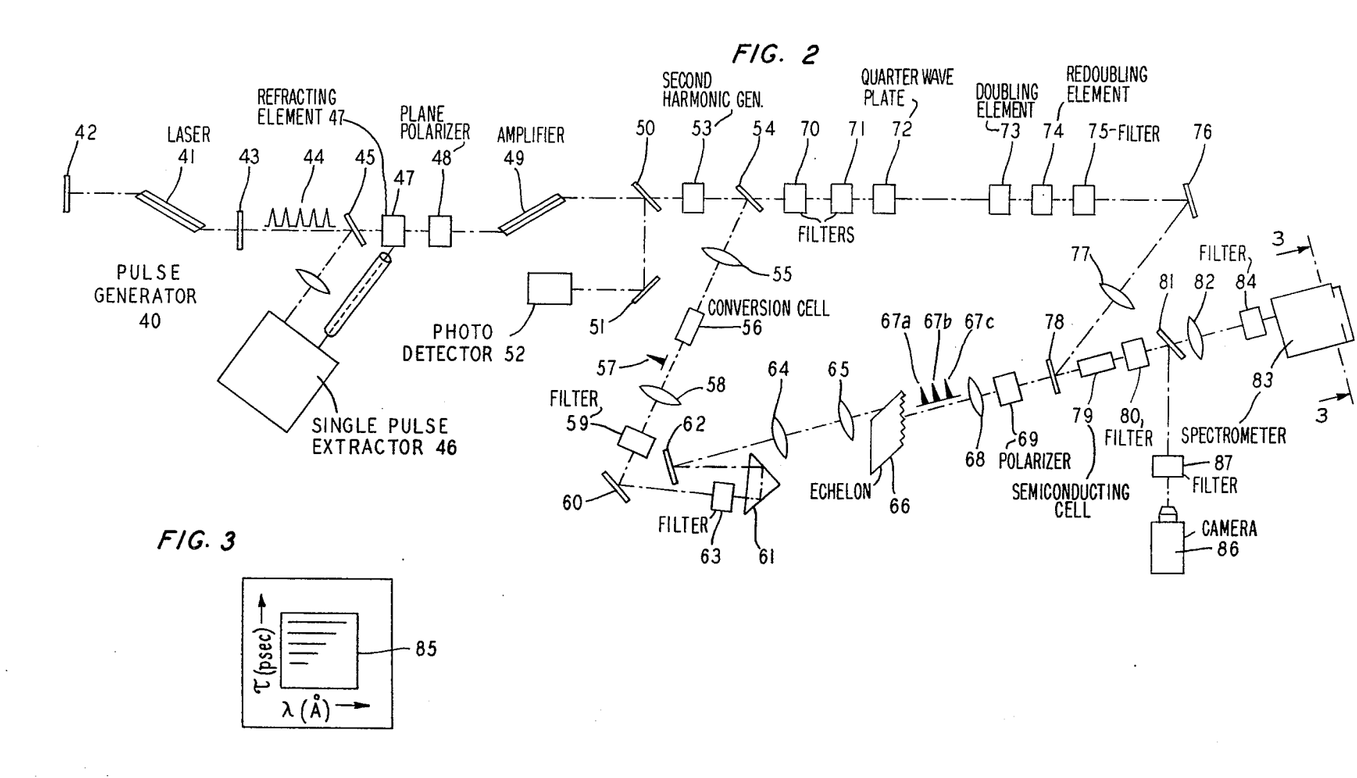
FIG. 2 is a schematic representation of a spectrometer in accordance with the invention.
FIG. 3 is a view of a recording plate on the apparatus of FIG. 2.

In some of the experimental work described, for example, in conjunction with FIG. 2, the initiating pulse was produced by a mode-locked neodymium glass laser which has a center wavelength of about 1.06μm. Since it was desired to produce a white pulse encompassing a significant portion of the visible spectrum, the laser emitting pulse was next passed through a second harmonic generator so as to result in a final initiating pulse of a center frequency of 0.53μm.

It is apparent that other means may be utilized to increase the center frequency of the initiating pulse. For example, the pulse may be directly produced by use of a mode-locked dye laser operating at high frequency or a different type of nonlinear medium, such as a third harmonic generator or a parametric oscillator may be utilized.

b. The conversion medium is generally an isotropic fluid. While a variety of materials are satisfactory, certain of the experiments described utilized $H_2O$ or $D_2O$, and such media must be considered exemplary. General requirements are based on the need to introduce the required virtual continuum—i.e., the material must have a reasonably efficient Raman coefficient.

Description has been largely in terms of a virtual continuum in the white pulse. This term has been defined and it, in turn, implies certain characteristics in the conversion medium. A truly constant amplitude white pulse or portion implies a virtual absence of stimulated Raman scattering. Stimulated scattering suggests relatively high efficiency for preferred transitions, and therefore imposes structure on the pulse. It follows that for a true continuum, Raman cross sections in the conversion medium should be such as to permit little stimulated scattering. Without a doubt, such conversion media with relatively inefficient scattering coefficients will be desired for some uses, notably for precise spectroscopy.

Under many circumstances stimulated Raman scattering is, on balance, desirable. Stimulated scattering, unlike spontaneous scattering, implies directionality and so permits relatively long spacing in between elements of refractive index above that of the ambient. Stimulated Raman scattering, since by its nature more efficient than spontaneous scattering, results in more effective frequency conversion. Under certain circumstances this more effective conversion may be of sufficient value to off-set the accompanying structure imposed on the pulse. For example, for communication purposes, particularly where the ultimate number of Heisenberg-permitted subchannels are not needed, it may be desired that as much as 80 percent or more of the converted energy result from stimulated scattering.

Where in the following portion of this section a range of Raman cross sections is specified, these are set forth in sufficient breadth to encompass essentially all conversion by spontaneous processing on the one hand, and in excess of 80 percent conversion by stimulated processes on the other.

As an example, a 10cm cell of $H_2O$ or $D_2O$ sufficient to produce a short white pulse while an equal length of $CS_2$ produces a white pulse elongated by approximately 10 psec.

The above considerations allude to the usual desideratum. In some cases, as noted, a virtual continuum is preferred; and this is true both for communications and for spectroscopy. Significant structure introduced by spectral peaks due to stimulated Raman scattering may, in the one case, effectively increase the noise level or limit the effectiveness of modulation, and in the other may be construed as indicative of absorption or emission characteristic of a sample under study. Where desired stimulated Raman peaks may be minimized by simple subtraction or may be removed by appropriate filtering (e.g.—by use of dielectric mirrors specifically designed to pass appropriate fractions of emission of wavelengths within the stimulated Raman peaks).

Dispersion of the medium is of importance with regard to white pulse length. It is apparent that the length of the medium is a compromise between tolerable pulse broadening due to dispersion and power level.

Raman cross-sections should ordinarily lie between values of $0.1 \times 10^{-30}$ cm²/molecule-steradian and $40 \times 10^{-30}$ cm²/molecule-steradian and suitable materials, as well as other relevant considerations, are set forth in 56 No. 7 *Journal of Chemical Physics*, 3384 Apr. 1, 1972.

Other requirements of the conversion medium are implicit. There must be sufficient transparency—first to prevent undue heating by the initiating pulse and finally to permit transmission of the white pulse. A region of high transparency—i.e., at least ninety percent should therefore extend over the entire spectrum defined at least by the initiating pulse. Where it is desired to extend the limits of the spectral content as well as to fill in wavelengths intermediate the modes present in the initiating pulse, transparency must coincide with such desired spectral limits.

Other mechanisms may result in energy storage ultimately producing breakdown, sometimes due to heating. For example, it is generally desired that the electronic polarizability be maintained below some maximum—i.e., that the medium have a Kerr constant below about that of $CS_2$ to maintain filamentation below a magnitude resulting in power concentration producing breakdown, as well as to minimize spreading due to dispersion. It is, however, desired that the electronic polarizability correspond with a minimum Kerr constant of 0.1 but not exceed about 40 (as measured in 2 *Optics Communications* 234 (1969)). The desire here is to produce the self-focusing or filamentation which, due to the non-linear dependence of refractive index on power, results in compression of cross-section of the pulse being processed. This, like many other of the conditions set forth, has been found to be desirable but may not be a requirement depending upon desired function. So, for example, while peak power level must, of necessity, be maintained in at least a portion of the conversion medium in order to produce the various frequency components required for the continuum, it may not be required—it may, in fact, be desirable that the pulse be permitted to increase in length.

A variety of conversion media are known to have properties which satisfy operating conditions in accordance with some or all of the inventive embodiments. These include acetone-carbon disulfide mixtures inorganic crystals, glasses, alcohols and hydrocarbons, as well as water and the deuterated equivalent noted. The general requirement for the conversion medium is properly stated in functional terms. It must be capable of introducing the required frequency components without destructive heating.

c. Other Elements

Design parameters for other elements are well known and are not set forth in this description. It is clear that any echelon, for example, should have sufficiently differing traversal paths, properly spaced, to result in the desired number of phase-separated component pulses.

The modulator should have appropriate aperture, particularly critical where it determines spectral channel width as well as sufficiently rapid response time to meet the design needs of the system. Prisms should be of sufficient size and surface smoothness to result in desired spatial separation. Monochromators, gratings, filters, beam splitters, extractors, etc., must meet design requirements, etc.

d. Reconstituted White Pulse

An implicit limitation on any system involving passage of energy through transmission line or other element of any real medium involves peak energy. The nature of the initiating pulse was such as to result in creation of spectral components mainly through Raman conversions in the conversion medium. It was noted that the conversion medium was of necessity of such nature as to prevent undue heating. The reconstituted pulse and the nature of any real transmission medium must be such as not only to avoid the heating which limits the nature of the conversion medium but as also to prevent any substantial frequency conversion through Raman or ancillary processes. It would be difficult to find a real transmission medium of sufficiently low ionic polarizability, of sufficiently low electronic polarizability, and also of sufficiently low Raman efficiency to permit introduction of a reconstituted pulse of a peak power approaching that of the initiating pulse. In general, for most glassy media, such considerations dictate a peak maximum of the order of a few KW. Reduction of peak power to this level may be accomplished in a variety of ways. For example, by defocusing so as to produce a wave front substantially larger than that of the initial transmission medium interface or simply by spreading through frequency dispersion common to all real materials. Suitable transmission media may be designed to evidence a variation of refractive index in a radial direction which is substantially parabolic with a peak value approximately corresponding to the center of the core.

THE DRAWING

Figure 1:
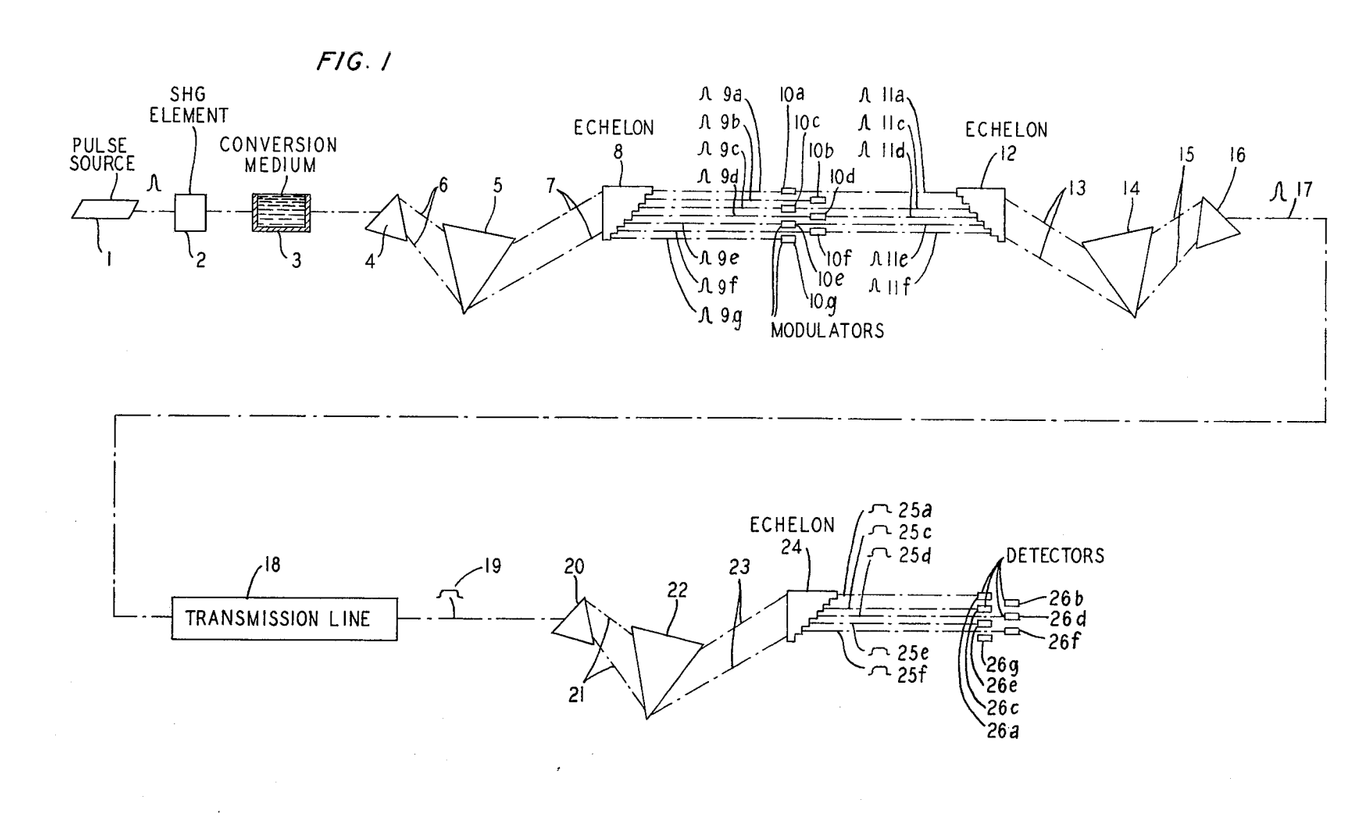
FIG. 1 is a schematic representation of a communications system in which subcarriers are produced by frequency multiplexing of white pulses.

FIG. 1 depicts a suitable source 1 for producing initiating pulses such as a neodymium-glass mode-locked laser followed by an SHG element 2 and a conversion medium 3. A pulse produced by source 1 and frequency doubled in element 2 is converted into a white pulse in conversion medium 3. Conversion medium 3 is followed by a pair of prisms 4 and 5 designed to first spread and finally to collimate the spread pulse (as in other of the included embodiments, diffraction gratings may replace prisms with no change in effect). This function is depicted schematically by broken lines 6 and 7 representing the geometric width of the white pulse. The beam directions depicted by broken lines 6 and 7 as introduced or exiting any concerned element are arranged at an incident angle corresponding with Brewster's angle. Since Brewster's angle is frequency dependent, it may be desirable to arrange the angle of incidence to correspond with the center frequency of that portion of the continuum of concern. Alternative or ancillary means for minimizing reflection include use of multiple layers of appropriate thickness and refractive index. The next element depicted is echelon 8 constructed, for example, of quartz or any other material of suitable transparency and refractive index. Operationally, the product of echelon 8 is depicted as a series of phase separated pulses 9a–9g. For the arrangement depicted, the effect of echelon 8 is to result in longest delay time for the longest wavelength component pulse of those depicted. Element 8 may be considered as representing one or a series of echelons as required to produce the desired number of component pulses. Following echelon 8, there is an array of modulators 10a–10g with means for introduction of signal information not shown. Where elements 10a–10g rely upon electro-optic interaction, they may be constructed, for example, of lithium tantalate, $LiTaO_3$, with straddling electrodes for altering the birefringence so as to either pass or block a related pulse 9a–9g on command. Modulators 10a–10g may operate by other mechanisms so, for example, where magneto-optic, control means may consist of a predominant magnetic bias together with an encircling turn or turns of conductor which when energized alter the polarization so as, again, to pass or block the transmission of a corresponding pulse. In such instance, there is need for related polarizing elements also not shown. As indicated, modulators 10a–10g may also function in analog fashion so as to produce an amplitude variation rather than operate simply as a digital switch. The possibility of frequency modulation is not precluded; but for ultimate use of signal capacity sophisticated clocking means are required for distinguishing between frequency altered components and the corresponding frequency components already present. For pedantic purposes, modulators 10b and 10g, treated as digital modulators, are considered to be in closed condition for the particular pulse sequence depicted; so that emanating pulses are 11a and 11c–11f. Reconstitution of a pulse is accomplished by a reverse sequence of elements, in this instance echelon 12 and prisms 14 and 16. Such elements are arranged so as to have the reverse effect of corresponding elements 8, 5 and 4. The effect of such elements is, again, shown in terms of broken lines, in this instance, 13 and 15. Pulse 17 emanating from prism 16 is now essentially a white pulse such as that produced by conversion medium 3 but for omission of spectral portions corresponding with pulses 11b and 11g. An apparatus variation may simply reflect the modulated pulses back through elements 8, 5 and 4 in that order to accomplish reconstitution.

For communication purposes, reconstituted pulse 17 is next introduced into a transmission line 18 which may, for example, be constructed of silica glass, modified or unmodified, with or without a clad of lowered index. The effect of any transmission line such as 18, since dispersive, is to result in some spreading so that the exiting pulse now designated 19 may be of a length many orders of magnitude greater than that of the introduced picosecond pulse 17. Such spreading is in no way disadvantageous. Spreading may be such as to completely fill spacing between pulses; in fact, there may be substantial overlapping so as to result in what is here referred to as a quasi-CW beam. An ultimate limit from a communication standpoint is dependent only on the resolution afforded by the particular apparatus used for detection. The dispersion limit corresponds with that set of conditions under which spectral portions corresponding with component pulses of succeeding reconstituted white pulses, themselves, overlap. It is apparent that, since a given wavelength component would never overcome the corresponding wavelength of the successive pulse, there is in theory no dispersion limit in the terms discussed.

The transmission system depicted includes a detector which may operate in the manner of the elements utilized for producing component pulses 9a–9g. Such an arrangement may consist of prisms 20 and 22 and possibly an echelon 24. The effect of elements 20 and 22 on the geometric pulse front width is depicted by broken lines 21 and 23. Component pulses exiting from echelon 24 are depicted 25a and 25c–25f to correspond with the exemplary condition depicted at the exiting side of modulators 10a–10g. Final detection and conversion to electrical signals is accomplished by means of detectors 26a–26g provided with electrode means or other signal output means not shown. These may be photodiodes, photomultipliers, pyroelectric detectors, etc.

FIG. 1, of course, depicts an exemplary communications system. The essence of all such systems is the creation of a white pulse, the separation of such white pulse into spectral portions denoted component pulses, modulation of such component pulses, the reconstitution of such modulated component pulses, and finally, transmission and some detection means sensitive to the now modulated nature of spectral components corresponding to the originally produced component pulses. Alternate means are available for accomplishing many of the functions depicted in FIG. 1. For example, the conversion medium may, itself, be so arranged as to perform the function of spatially displacing spectral portions; echelons so useful for phase separation may be eliminated altogether with modulators and/or detector elements serving the function of quantizing the spectral portions of concern, separation of spectral portions need not be quantized, separation (continuous or quantized) may be accomplished before or after modulation reconstitution, may be accomplished simply by introduction of component pulses into a transmission medium, etc. The very spreading of the reconstituted white pulse through the transmission medium may perform a useful function in its inherent separation of spectral portions.

FIG. 2 is a spectrometer utilizing a white pulse as described herein. The Figure is rather detailed and represents equipment specifically designed to measure minority carrier electron recombination lifetime in a semiconductor. The depicted equipment consists of pulse generator 40 which may, again, consist of a mode-locked laser, in turn, made up of laser medium 41 within the cavity defined by mirrors 42 and 43, the first of which is completely reflecting; the second of which is partially reflecting. The output of pulse generator 40 is pulse train 44 which via reflecting element 45 is directed into single pulse extractor 46, the output of which is redirected by refracting element 47. The single pulse is then passed through a plane polarizer 48, thence through amplifier 49. A portion of the amplified pulse is extracted by beam splitter 50; and by virtue of mirror 51, is directed into photodetector 52 which serves simply to monitor the process. The major portion of the pulse is permitted to pass through beam splitter 50 and into second harmonic generator 53 made, for example, of a non-linear medium, such as, potassium dihydrogen phosphate or lithium niobate which, in this particular apparatus, was useful in converting the 1.06μm output of pulse generator 40 into radiation of a center frequency of 0.53μm in length. The second harmonic pulse is then split by beam splitter 54 with one portion being passed through focusing lens 55 into a cell 56 of the conversion medium. The outgoing pulse 57, now a white pulse, is passed through lens 58 where the pulse is expanded and through filter 59 which eliminates undesired wavelengths. The following segment of the traversal path defined by mirror 60, prism 61, which is mounted on a translating table not shown, and mirror 62 is adjustable in length so as to bring about the desired time relationship of the two portions of the pulsed energy following the differing routes defined by beam splitter 54. Filter 63 forms a function similar to that of filter 59. Focusing means 64 and 65 focus/defocus and collimate pulse energy so as to irradiate the required area of echelon 66. The effect of echelon 66 is to result in phase separated pulses depicted schematically as 67A, B, C. The pulse stream so defined is next passed through lens 68 and polarizer 69 so as to fill the aperture of element 79 while having appropriate polarization resulting from passage through polarizer 69.

Returning now to beam splitter 54, a portion of the pulse is passed through filter 70 which selectively passes the 1.06μm portion; then through neutral density filter 71 where the amplitude is attenuated to the level appropriate for the remaining elements in the system. Element 72 is a quarter wave plate designed to change the polarization of the beam. The pulse is then passed through first doubling element 73 and redoubling element 74 so finally resulting in some 0.265 micrometer wavelength energy which is selectively passed by filter 75. Mirror 76 is so arranged as to make this path equal to a path within the range of adjustment for the path defined by that portion of the pulse passed through lens 55. Lens 77 is in the system to correct for diversions introduced by preceding elements in the path. The two paths converge by reflection and transmission through element 78; and thereafter, two types of measurements are conducted. Cell 79 contains a semiconducting medium within which electrons are assigned by minority carrier injection by means now shown with such introduction synchronized in some desired fashion with some part of the introduced pulse train. It should be noted at this point that, while pulses have been depicted as linear trains, this schematic representation is, in fact, that of the expected output of echelon 66 which is that of phase modulated pulses following parallel non-coincident paths. This pulse sequence is made incident on cell 79 emanations of which are passed through filter 80 in order to eliminate spurious and the so processed information is then split into two paths by beam splitter 81. Lens 82 collimates or otherwise adjusts the path spacing to accommodate the physical dimensions of spectrometer 83, while filter 84 allows only the wavelength carrying processed information to pass. As shown in View 3—3 (FIG. 3), spectrometer plate 85 depicts a series of scan lines of diminishing length with such lines corresponding with electron rate resulting from absorption produced in cell 79. For the arrangement depicted, the greatest delay time exceeds that of the recombination lifetime for the electrons so that the lower-most portion of the plate corresponds to the fifth layer of a greater number of layers. The other path defined by beam splitter 81 results in introduction of pulse energy into camera 86 with filter 87 serving to cut off transmission of other wavelengths in the camera. The camera is through a fluorescent screen, not shown, so arranged as to record the two photon fluorescents resulting from opposing motion of mating pulses from the two paths defined by beam splitter 54. This apparatus has been utilized to directly measure carrier lifetime of injected electrons in a variety of semiconducting media.

What is claimed is:

1. Apparatus for processing an initiating pulse of optical electromagnetic radiation of a pulse duration of a maximum of 100 picoseconds so as to alter the spectral distribution of the pulse, characterized in that first means is provided for frequency converting spectral components within the said pulse so as to increase the number of spectral components there contained, thereby producing a pulse containing a substantial continuum of wavelengths over a spectrum at least as extensive as that of the initiating pulse, such pulse here designated a white pulse, in that second means is provided for separating said white pulse into a plurality of spectral portion pulses here designated component pulses regardless of whether such portions are discontinuous in phase or time each of said component pulses containing distinct spectral portions of the substantial continuum contained within the said white pulse, in that third means is provided for selectively modulating said component pulses, and in which fourth means is provided for further processing radiation as processed by the said third means.

2. Apparatus of claim 1 in which said second means provides for spatial separation.

3. Apparatus of claim 2 in which said second means comprises at least one prism.

4. Apparatus of claim 2 in which said second means comprises at least one grating.

5. Apparatus of claim 1 in which said second and third means provide for actual separation of component pulses.

6. Apparatus for processing an initiating pulse of optical electromagnetic radiation of a pulse duration of a maximum of 100 picoseconds so as to alter the spectral distribution of the pulse, characterized in that first means is provided for frequency converting spectral components within the said pulse so as to increase the number of spectral components there contained, thereby producing a pulse containing a substantial continuum of wavelengths over a spectrum at least as extensive as that of the initiating pulse, such pulse here designated a white pulse, in that combined means is provided for (1) separating said white pulse into a plurality of spectral portion pulses here designated component pulses regardless of whether such portions are discontinuous in phase or time each of said component pulses containing distinct spectral portions of the substantial continuum contained within the said white pulse, and for (2) selectively modulating said component pulses, and in which fourth means is provided for processing radiation as processed by the said combined means.

7. Apparatus of claim 1 in which said second means provides for phase separation.

8. Apparatus of claim 7 in which said second means comprises at least one echelon.

9. Apparatus of claim 8 in which said second means includes at least one prism or grating so that separation in terms of spectral components is both spatial and phase.

10. Apparatus of claim 1 in which said third means comprises a sample of material to produce a modulated signal and in which the said fourth means produces a display sensitive to the said modulated signal produced by the said third means.

11. Apparatus of claim 1 in which said third means comprises a plurality of modulators each associated with a component pulse.

12. Apparatus of claim 11 in which the modulators are digital modulators so arranged as to substantially pass or block a particular component pulse.

13. Apparatus of claim 12 in which the said modulators are electro-optical modulators.

14. Apparatus of claim 1 in which the said fourth means comprises means for reconstituting modulated component pulses into a single pulse.

15. Apparatus of claim 14 in which the said third means comprises a plurality of modulators each associated with a component pulse.

16. Apparatus of claim 15 in which the said fourth means includes a transmission medium into which the reconstituted pulse is introduced.

17. Apparatus of claim 16 in which the said fourth means includes means for reducing the peak power of the said reconstituted pulse to a level inadequate both to result in substantial frequency conversion in the transmission medium and to result in substantial deterioration in the transmission medium.

18. Apparatus of claim 16 provided with detector means at the exiting end of the transmission medium, said detecting means being sensitive to modulation effects produced by the said third means for subcarrier spectral portions corresponding to the spectral portions contained within the said component pulses, said apparatus together with said detector means constituting a communications system.

19. System of claim 18 in which the said transmission line comprises a core consisting essentially of a solid amorphous medium.

20. System of claim 19 in which the said transmission line is clad with a material of a lower index of refraction relative to that of the said core.

21. System of claim 20 in which the said transmission medium has a variation of refractive index in a radial direction which is substantially parabolic with a peak value approximately corresponding to the center of the said core.

22. Apparatus of claim 1 in which the said first means comprises a conversion medium has a Raman cross section of from $0.1 \times 10^{-30}$cm$^2$/molecule-steradian to $40 \times 10^{-30}$cm$^2$/molecule-steradian and a Kerr constant of from 0.1 to 33.

23. Apparatus of claim 22 in which the said conversion medium consists essentially of a fluid.

24. Apparatus of claim 23 in which said fluid consists essentially of at least one compound selected from the group consisting of $H_2O$ and $D_2O$.

25. Apparatus of claim 1 in which the initiating pulse is a mode-locked laser pulse.

26. Apparatus of claim 25 in which the said mode-locked laser contains trivalent neodymium as the active species.

27. Apparatus of claim 26 in which the host for the said active species is substantially amorphous.

28. Apparatus of claim 26 in which the initiating pulse results from conversion means for extending the spectrum in a higher frequency direction.

29. Apparatus of claim 28 in which said conversion means includes a second harmonic generator.

30. Apparatus for processing an initiating pulse of optical electromagnetic radiation of a pulse duration of a maximum of 100 picoseconds so as to alter the spectral distribution of the pulse, characterized in that first means is provided for frequency converting spectral components within the said pulse so as to increase the number of spectral components there contained, thereby producing a pulse containing a substantial continuum of wavelengths over a spectrum at least as extensive as that of the initiating pulse, such pulse here designated a white pulse, in that selective modulation means is provided for selectively modulating spectral components within the said white pulse, so as to produce a selectively modulated white pulse, in that separation means is provided for separating the said white pulse as selectively modulated by the said selective modulating means into a plurality of spectral portion pulses here designated component pulses regardless of whether such portions are discontinuous in phase or time each of said component pulses containing distinct spectral portions contained within the said selectively modulated white pulse, and in which processing means is provided for further processing radiation as processed by the said separation means.

* * * * *

UNITED STATES PATENT OFFICE
CERTIFICATE OF CORRECTION

PATENT NO. : 3,873,825
DATED : March 25, 1975
INVENTOR(S) : Robert P. Jones and Peter M. Rentzepis It is certified that error appears in the above-identified patent and that said Letters Patent are hereby corrected as shown below:

Column 1, line 22, "$10^{-4}$" should read --$10^{-14}$--.

Column 2, line 45, "transparency" should read --rather--.

Column 3, line 67, between "center" and "of" insert --wavelength--.

Column 5, line 50, "accomodte" should read --accommodate--.

Signed and Sealed this sixteenth Day of September 1975

[SEAL]

Attest:

RUTH C. MASON
*Attesting Officer*

C. MARSHALL DANN
*Commissioner of Patents and Trademarks*